United States Patent
Reisinger et al.

(10) Patent No.: US 10,207,630 B2
(45) Date of Patent: Feb. 19, 2019

(54) METHOD FOR CONTROLLING A LIGHT SCANNER IN A HEADLAMP FOR VEHICLES

(71) Applicant: ZKW Group GmbH, Wieselburg (AT)

(72) Inventors: Bettina Reisinger, Amstetten (AT); Thomas Mitterlehner, Mank (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days.

(21) Appl. No.: 15/568,154

(22) PCT Filed: Mar. 10, 2016

(86) PCT No.: PCT/AT2016/050055
§ 371 (c)(1),
(2) Date: Oct. 20, 2017

(87) PCT Pub. No.: WO2016/172747
PCT Pub. Date: Nov. 3, 2016

(65) Prior Publication Data
US 2018/0147978 A1 May 31, 2018

(30) Foreign Application Priority Data

Apr. 27, 2015 (AT) .............................. A 50339/2015

(51) Int. Cl.
*B60Q 1/06* (2006.01)
*B60Q 1/08* (2006.01)
(Continued)

(52) U.S. Cl.
CPC .............. *B60Q 1/06* (2013.01); *B60Q 1/085* (2013.01); *F21S 41/14* (2018.01); *F21S 41/16* (2018.01);
(Continued)

(58) Field of Classification Search
CPC ......... B60Q 1/06; B60Q 1/085; F21S 41/675; F21S 41/663; F21S 41/14; F21S 41/16; G02B 27/0983
See application file for complete search history.

(56) References Cited

U.S. PATENT DOCUMENTS 9,752,745 B2 9/2017 Erdl et al.
2007/0171497 A1 7/2007 Ishihara et al.
(Continued)

FOREIGN PATENT DOCUMENTS

| DE | 102009025678 A1 | 1/2010 |
| EP | 2581648 A1 | 4/2013 |
| WO | 2005/121866 A1 | 12/2005 |

OTHER PUBLICATIONS

Office Action issued in AT Application No. A50339/2015, dated Feb. 22, 2016 (3 pages).
(Continued)

*Primary Examiner* — Julie A Bannan
(74) *Attorney, Agent, or Firm* — Eversheds Sutherland (US) LLP

(57) ABSTRACT

The invention relates to a method for controlling a light scanner (7) in a headlight for vehicles, wherein the laser beam of at least one modulated laser light source (1) is directed in a scanning manner, by way of the light scanner, onto a light conversion means (8) so as to generate a light image (11) thereon, which is projected via an imaging system (12) as a light image (11') onto the roadway, a micromirror (10) of the light scanner is pivoted according to defined characteristic control curves in at least one coordinate direction, the desired light image (11) is divided into a pixel set having n rows and/or m columns, the horizontal and/or vertical characteristic control curves for the micromirror (10) are adapted to at least one selected row and/or column in terms of the required optical power of the pixels,
(Continued)

and the adapted horizontal and/or vertical characteristic control curves are used to control the micromirror.

9 Claims, 7 Drawing Sheets

(51) Int. Cl.
*F21S 41/14* (2018.01)
*F21S 41/663* (2018.01)
*F21S 41/675* (2018.01)
*F21S 41/16* (2018.01)
*G02B 27/09* (2006.01)

(52) U.S. Cl.
CPC ........... *F21S 41/663* (2018.01); *F21S 41/675* (2018.01); *G02B 27/0983* (2013.01)

(56) References Cited

U.S. PATENT DOCUMENTS

| | | |
|---|---|---|
| 2008/0239252 A1 | 10/2008 | Konno et al. |
| 2009/0046474 A1 | 2/2009 | Sato et al. |
| 2013/0258689 A1 | 10/2013 | Takahira et al. |
| 2014/0003070 A1* | 1/2014 | Nakaya .................. B60Q 1/08 362/466 |
| 2014/0029282 A1 | 1/2014 | Ravier et al. |
| 2015/0055359 A1 | 2/2015 | Erdl et al. |
| 2017/0038582 A1* | 2/2017 | Chau .................. G02B 27/0101 |

OTHER PUBLICATIONS

International Search Report and Written Opinion for PCT/AT2016/050055, dated Jun. 30, 2016 (12 pages).

* cited by examiner

Fig. 11

METHOD FOR CONTROLLING A LIGHT SCANNER IN A HEADLAMP FOR VEHICLES

SUMMARY

The invention relates to a method for controlling a light scanner in a headlight for vehicles, wherein the laser beam of at least one modulated laser light source is directed in a scanning manner, by way of the light scanner, onto a light conversion means so as to generate a light image thereon, which is projected via an imaging system as a light image onto the roadway, and a micromirror of the light scanner is pivoted according to defined characteristic control curves in at least one coordinate direction.

The invention furthermore relates to a headlight for vehicles, comprising at least one modulated laser light source, the laser beam of which can be directed in a scanning manner, by way of a light scanner, onto a light conversion means so as to generate a light image thereon, which is projected via an imaging system as a light image onto the roadway, and a micromirror of the light scanner being pivotable according to defined characteristic control curves in at least one coordinate direction, and furthermore comprising a laser control unit and a processing unit associated therewith.

Headlights operating by way of scanning laser beams using a light conversion means are known. They usually generate a light image on a light conversion means, often referred to simply as a "phosphor," on which the blue laser light, for example, is essentially converted into "white" light by way of fluorescence. The generated light image is then projected onto the roadway with the aid of the imaging system, such as a lens optical system. The light scanner or the beam deflection means is generally a micromirror, which can be moved about one axis or about two axes, so that, for example, a row-by-row light image is "written." The modulation of the laser light source determines the desired luminance for every pixel or every row of the light image, which must satisfy statutory requirements for the projected light image on the one hand, and must be adaptable to the particular driving situation on the other.

The use of the light scanner having one or more laser beams, which are modulated synchronously with the mirror oscillation, makes it possible to generate a virtually arbitrary light distribution. Such a method, in principle, is also known for so-called pico projectors and head-up displays, which likewise use light scanners that are designed as microelectromechanical systems (MEMS). In contrast to such projection systems, which are frequently used in entertainment electronics, however, considerably higher laser power is required for headlights, wherein, on the other hand, there is no need to represent a colored light distribution. As mentioned above, usually blue laser light, which stems from laser diodes, for example, is employed. In light of the required high laser power in the order of magnitude of 5 to 30 watt, it is important to utilize the laser power installed in a headlight in the best possible manner.

Most known light scanners, for which hereafter occasionally also the term "microscanners" will be used, operate according to a resonant drive principle. The micromirrors employed are excited at the resonant frequency thereof and oscillate sinusoidallly. Precisely this sinusoidal progression represents a major problem with respect to the utilization of the installed laser power, for which reference is made to FIG. 2. For this figure, for example, a constant laser power of $P_{Laser}=1$ W was assumed, and a resolution of 60×30 pixels was defined, which represents only one possible example. It is apparent that, due to the sinusoidal movement of the micromirror, considerably less optical power (0.23 mW/pixel) is present at the center of the image than in the edge regions, in which the power per pixel is 1.75 mW, and in the four corners of the image, where it is as much as 9.63 mW.

Such a light distribution is not desirable for projection applications, and specifically for head-up displays and pico projectors, since all pixels should have the same brightness in these. For this reason, it is known to compensate for the change in brightness due to the sinusoidal progression by modulating the laser power synchronously with the oscillation of the mirror, wherein the laser power is reduced toward the edge so as to achieve a homogeneous light distribution, in which every pixel has the same brightness. The maximum brightness of the compensated image is adapted to the lowest brightness of the uncompensated image, which, based on FIG. 2, means that every pixel has an impinging laser power of 0.23 mW/pixel in a compensated light image.

Due to the compensation of the brightness progression, the average laser power introduced into the system must be reduced by 60%, which is to say, in the example according to FIG. 2, the means used only 0.4 W of laser power that is $P_{Laser}=1$ W, wherein it must be noted that average power levels are referred to here. In this light distribution as well, the laser diode must be able to briefly deliver optical power of 1 W. However, since the power is reduced in the edge regions, the resultant average power will be considerably lower.

The described problem is exacerbated even further when the scanning method is employed with motor vehicle headlights. Light distributions that are generated for primary lighting functions in vehicle headlights are equally bright in all pixels only in rare instances. On the contrary, it is even desirable, in terms of the light distributions of a motor vehicle headlight, that the edge regions are considerably darker than the center of the image, where usually a so-called light spot is to be generated. This light spot illuminates the roadway, while the edge regions illuminate the surrounding area of the roadway. For illustration purposes, an exemplary light distribution shall be considered, which is suitable as an added high-beam light and shown in FIG. 3. It is apparent here that high light output is required in the center of the image (100%), while the brightness decreases considerably in the edge regions, wherein regions having 30% and 5% are shown and identified. If, in this case, the laser power of a micromirror oscillating sinusoidally in two directions is compensated for, it is possible to show that only 13% of the installed laser power is still being utilized.

One option to address the aforementioned problem at least partially is to vary the scanning speed, which is to say in the case of a mirror the angular deflection based on the time $d\alpha/dt$. Since a slowly scanning light spot generates more light in the light conversion means than a rapidly moving spot, it is likewise possible to influence the light distribution in this way. However, this requires micromirrors that no longer oscillate resonantly, but that can be substantially linearly controlled at least in one coordinate direction.

A linearly controlled drive axis of the micromirror already allows the utilization of the installed laser power to be considerably increased, namely to approximately 20%. If the second axis of the micromirror is also linearly driven, a further increase in the utilization to, theoretically, as much as 30% can be achieved. However, 30% utilization of the laser power also means that three times the laser power must be installed than would theoretically be necessary. In practice, this means that, for example, three times the number of laser diodes must be installed in a headlight, which considerably impacts the price of such a headlight, due in no small part to the need for focusing.

A method and a headlight in which the scanning speed is decreased so as to generate regions having higher intensity also became known from DE 10 2012 205 437 A1, wherein the problem of the lack of efficiency is addressed. Moreover, it is possible to alter the spot diameter of the laser beam, wherein, however, the laser power is not changed.

Furthermore, US 2009/0046474 A1 describes a headlight in which the light of at least one light source is directed in a scanning manner onto the roadway via a controlled mirror, which can be rotated about one axis or two axes, using a projection lens. The light source can be switched on or off during scanning, and the brightness can be altered by the speed of rotation of the mirror. This document, however, does not describe scanning a laser beam across a phosphor for generating a light image.

A headlight operating according to a method, or a headlight as described at the outset, became known from US 2014/0029282, wherein either the scanning speed or the intensity of the laser beam is altered to generate an adaptive illumination/light image.

It is an object of the invention to create a method and a headlight operating according to such a method, in which improved utilization of the installed laser power is possible, at preferably low complexity for control, in particular of the micromirror.

This object is achieved by a method of the type mentioned at the outset, in which according to the invention the desired light image is divided into a pixel set having n rows and/or m columns, the horizontal and/or vertical characteristic control curves for the micromirror are adapted to at least one selected row and/or column in terms of the required optical power of the pixels, and the adapted horizontal and/or vertical characteristic control curves are used to control the micromirror.

It is expedient in the spirit of rapid optimization if the selected row and/or column are those in which, in total across the n pixels thereof, the maximum illumination intensity is required.

In one variant that has been tried and tested in practice, it is provided that the desired light image is divided into a pixel set having n rows and m columns;

in a first step, for optimizing the characteristic control curves according to the desired light distribution for every pixel of the pixel set, the required illumination intensity $E_{ij}$ is defined;

in a second step, the column/row selected is that in which, in total across the n pixels thereof, the maximum illumination intensity, namely the total illumination intensity of this column c2/row, is required;

in a third step, it is calculated, proceeding from this total illumination intensity, what unit of time per illumination intensity $t_{s1x}$ is available on average in this column/row, namely $t_{s1x}=T_S/E_{c2\ ges.}$, wherein $T_S$ denotes half the period duration of the column period/row period, and $E_{c2\ ges.}$ denotes the sum of all predefined illumination intensity values per pixel which is required in this half period duration of the column period;

in a fourth step, the illumination intensities $E_{c2n}$ of the column/row, which are present in a series, are used to create a new series, wherein the illumination intensity $E'_{c2n}$ of every element of the new series is $E'_{c2n}=\Sigma_{j=1}^{n} E_{c2j}$;

in a fifth step, every element of the new series is multiplied by the unit of time per illumination intensity $t_{1x}$ so as to obtain a new time series that, by way of the deflection angle $\alpha_V'=\alpha_{Vmax}/n$ available for each pixel, is defined as a new optimized characteristic control curve, and every element of the new time series is multiplied by the deflection angle $\alpha'=\alpha_{max}/n$ available for every pixel, whereby a deflection, and thus an optimized characteristic control curve, is obtained for every pixel of the column/row; and in a sixth step, this characteristic control curve is used to control the micromirror for each column/row.

In many cases, this yields a sufficiently optimized result if the remaining axis is controlled using a defined, non-optimized characteristic control curve.

On the other hand, it may still be advantageous if in a seventh step, the utilization of the laser power per pixel is evaluated, and the row/column having the best utilization $\eta_{max}$ is ascertained;

in an eighth step, the column having optimal utilization of the installed laser power is selected and used for the optimization of the characteristic control curve of the remaining axis, and thereafter the procedure follows steps analogously to the first, second, third and fourth steps, proceeding from the utilization of the installed laser power per pixel, wherein all utilizations of the installed laser power in the respective pixel are added up in the row in which the previously ascertained highest utilization of the installed laser power was able to be delivered;

in a ninth step, it is subsequently calculated, proceeding from the utilization $\eta_{r2\ ges}$, what unit of time per utilization $t_{Z\eta}$ is available in this row, $$t_{Z\eta}=T_Z/\eta_{r2\ ges.}$$

wherein $T_Z$ is half the period duration of the row period, and $\eta_{r2\ ges.}$ is the sum of all calculated or measured utilizations of the installed laser power per pixel which is required in this half period duration of the row period;

in a tenth step, the respective utilization values of the row are used to create a new series, wherein the illumination intensity $\eta'_{r2m}$ of every element of the new series is $\eta'_{r2m}=\Sigma_{j=1}^{m} \eta_{r2j}$;

in an eleventh step, the elements of the new series are multiplied by the unit of time per utilization $t_{Z\eta}$ and, by way of the deflection angle $\alpha_H'=\alpha_{Hmax}/m$ available for every pixel, are defined as a new optimized horizontal/vertical characteristic control curve.

This yields a particularly good optimized result if, in a twelfth step, the optimized characteristic control curve is used for the vertical/horizontal and the horizontal/vertical axis and, analogously to the seventh step, the utilization of the installed laser power per pixel is ascertained.

It may also be expedient in certain cases if the optimization of the characteristic control curves is carried out step by step in reverse order with respect to the rows and columns, or axes, so as to obtain furthermore two optimized characteristic control lines.

It is advisable to make a selection from all the resulting optimized characteristic control curves as a function of the desired light image, wherein the most favorable combination is used to control the light scanner.

The object of the invention is also achieved by a headlight of the type described at the outset, in which the processing unit is configured to carry out the method according to any one or more of claims 1 to 8, which were described above.

The invention, along with further advantages, will be described in greater detail hereafter based on exemplary embodiments, which are illustrated in the drawings. In the drawings:

FIG. 1 schematically shows the components of a headlight essential for the invention, and the relationship thereof.

FIG. 11 shows another diagram illustrating the utilization of the installed laser power after carrying out a further optimization method.

Figure 1:
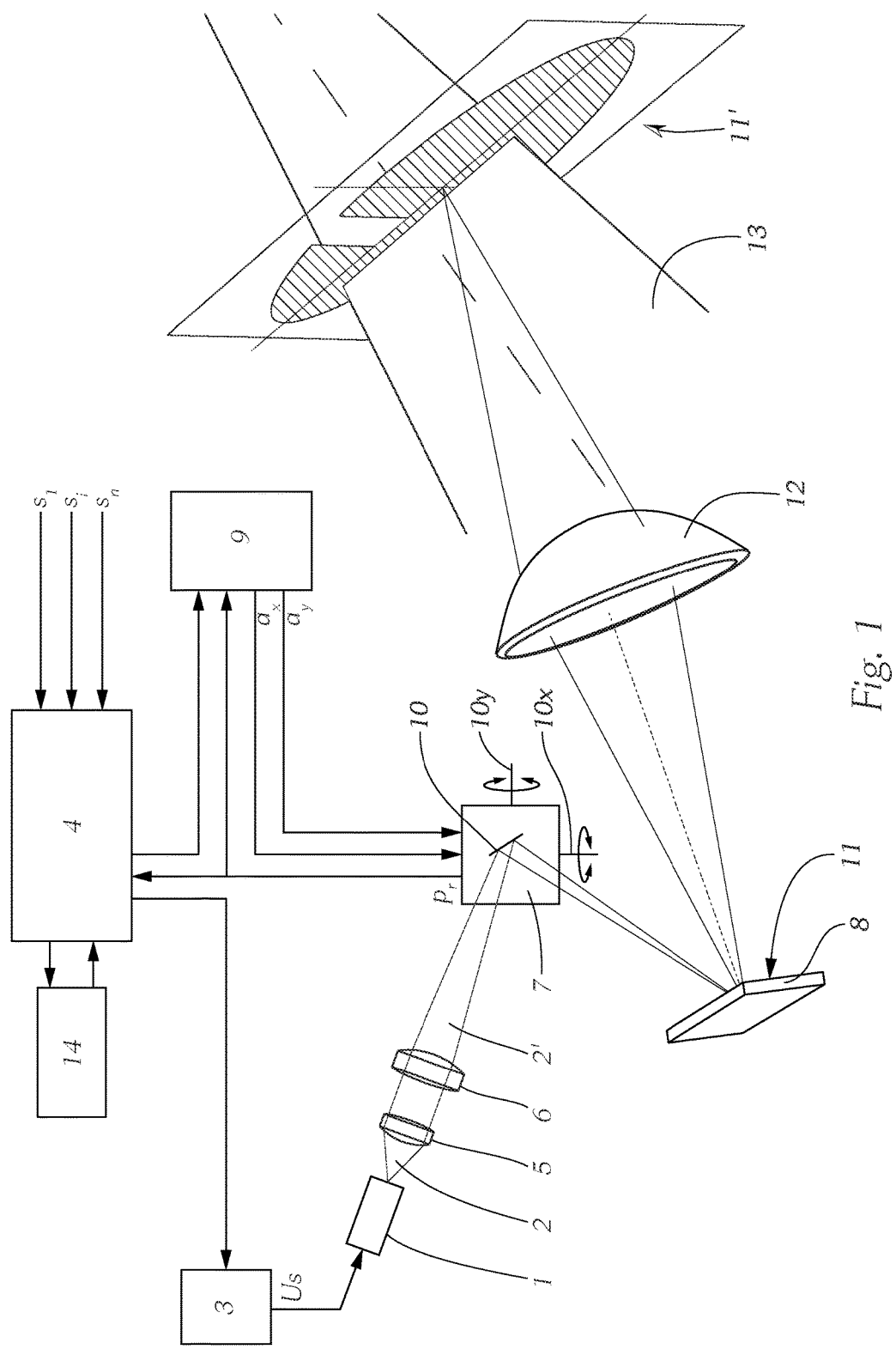
Figure 2:
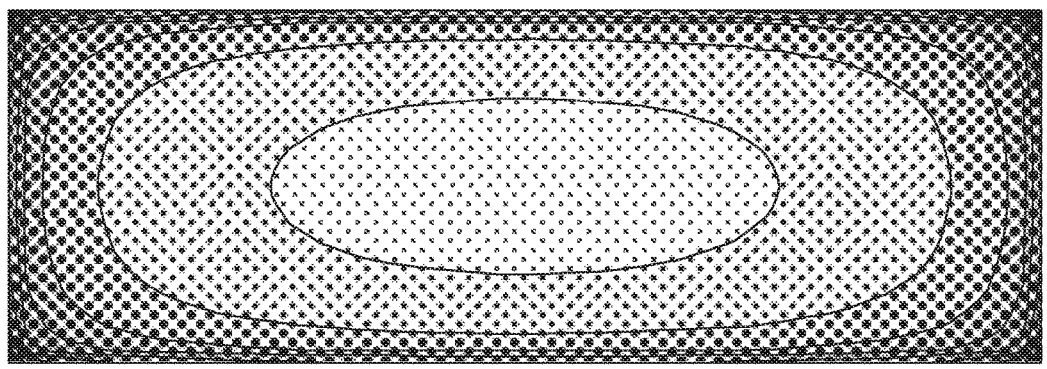
FIG. 2 shows the power distribution based on a light image generated by a scanning laser beam, which is deflected by a conventional mirror oscillating about two axes.
Figure 3:
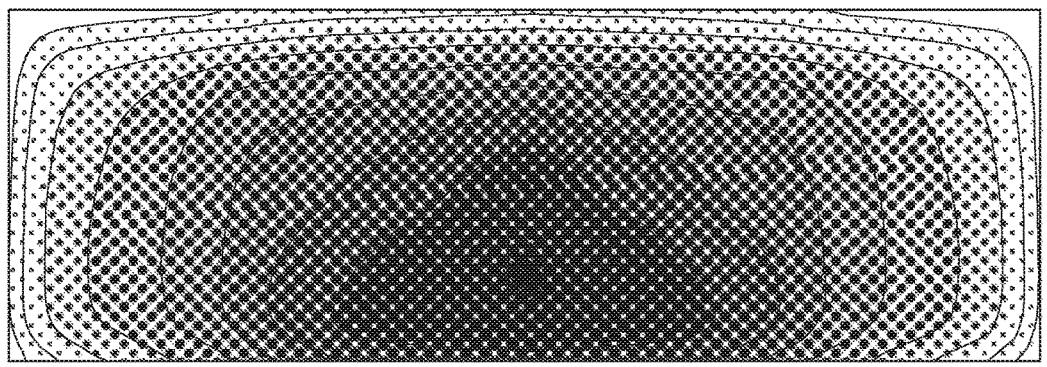
FIG. 3 shows a desirable, exemplary light distribution for a headlight.

Referencing FIG. 1, one exemplary embodiment of the invention will now be described in greater detail. In particular, the parts important for a headlight according to the invention are shown, wherein it is clear that a motor vehicle headlight also contains a number of other parts that allow useful use of the headlight in a motor vehicle, such as in particular a passenger car or motorcycle. The lighting-related starting point of the headlight is a laser light source 1, which emits a laser beam 2 and which is associated with a laser control unit 3, wherein this control unit 3 is used for power supply purposes and for monitoring the laser emission or, for example, for controlling the temperature, and is also configured to modulate the intensity of the emitted laser beam. "Modulating" in the context of the present invention is understood to mean that the intensity of the laser light source can be altered, either continuously or in a pulsed manner, within the meaning of switching on and off. What is essential is that the light output can analogously be dynamically altered, depending on the angular position of a mirror, which will be described later. Additionally, there is also the option of switching on and off for a certain period of time so as not to illuminate or to suppress defined areas. One example of a dynamic control concept for generating an image by way of a scanning laser beam is described, for example, in document A 514633 by the applicant.

In practice, the laser light source often comprises multiple laser diodes, for example six, each being 1 watt, so as to achieve the desired power or the required luminous flux. The control signal of the laser light source 1 is denoted by $U_s$.

The laser control unit 3, in turn, receives signals from a central processing unit 4, which can be supplied sensor signals $s_1 \ldots s_i \ldots s_n$. These signals can be switching commands for switching from high-beam light to low-beam light, for example, or signals recorded, for example, by sensors $S_1 \ldots S_n$, such as cameras, which pick up the lighting conditions, environmental conditions and/or objects on the roadway. The signals can also stem from vehicle-to-vehicle communication information. The processing unit 4 shown here schematically in the form of a block can be included entirely or partially in the headlight and is used, in particular, to carry out the method of the invention described hereafter.

The laser light source 1 emits blue or UV light, for example, wherein a collimation optical system 5 and a focusing optical system 6 are connected downstream of the laser light source. The configuration of the optical systems depends, among other things, on the type, number and spatial arrangement of the laser diodes used, the required beam quality, and the desired laser spot size on the light conversion means.

The focused or shaped laser beam 2' arrives at a light scanner 7 and is reflected by a micromirror 10 onto a light conversion means 8 designed as a luminous area in the present example, which comprises a phosphor for light conversion, for example, in the known manner. The phosphor converts blue or UV light into "white" light, for example. "Phosphor" in the context of the present invention is generally understood to mean a substance or a substance mixture that converts light having one wavelength into light having a different wavelength or a wavelength mixture, and in particular into "white" light, which can be subsumed under the term "wavelength conversion."

Luminescence dyes are used, wherein the starting wavelength is generally shorter, and thus higher in energy, than the emitted wavelength mixture. The desired white light impression is created by additive color mixing. "White light" is understood to mean light having a spectral composition that evokes a "white" color impression in humans. Naturally, the term "light" is not limited to radiation visible to the human eye. Optical ceramics, for example, may be used for the light conversion means, which are transparent ceramics such as YAG-Ce (cerium-doped yttrium aluminum garnet).

It shall be noted at this point that the drawing shows the light conversion means as a phosphor surface, on which the scanning laser beam generates, or scanning laser beams generate, an image that is projected proceeding from this side of the phosphor. However, it is also possible to use a translucent phosphor, in which the laser beam, coming from the side facing away from the projection lens, generates an image, wherein, however, the emitting side is located on the side of the light conversion means facing the projection lens. In this way, both reflective and transmissive beam paths are possible, wherein ultimately a mixture of reflective and transmissive beam paths is not excluded either.

The micromirror 10 oscillating about two axes in the present example is controlled by a mirror control unit 9 with the aid of driver signals $a_x$, $a_y$ and, for example, is deflected in two directions x, y that are orthogonal to one another. The mirror control unit 9 is also controlled by the processing unit 4 so as to be able to set the oscillation amplitudes of the micromirror 10 and the instantaneous angular speed thereof, wherein asymmetric oscillations about the respective axis may also be settable. The control of micromirrors is known and can take place in a variety of ways, such as electrostatically, electromagnetically or electrodynamically. In tried and tested embodiments of the invention, the micromirror 10 pivots in the x direction about a first rotational axis 10x, and in the y direction about a second rotational axis 10y, and the maximum amplitude, as a function of the control thereof, results in deflections in the resulting light image of, for example, +/−35° in the x direction and −12° to +6° in the y direction, wherein the mirror deflections are half of these values.

The position of the micromirror 10 is advantageously reported back to the mirror control unit 9 and/or to the processing unit 4 with the aid of a position signal $p_r$. It shall be noted that other beam deflection means, such as movable prisms, may be used, even though the use of a micromirror is preferred.

The laser beam 2' thus scans across the light conversion means 8, which is generally planar, but does not have to be planar, and generates a light image 11 having a predefined light distribution. This light image 11 is now projected onto the roadway 13 as a light image 11' by way of an imaging system 12. The laser light source is pulsed at high frequency or continuously controlled in this process, so that, corresponding to the position of the micromirror, arbitrary light distributions can not only be set, such as high-beam light/low-beam light, but can also be rapidly altered when a particular terrain or roadway situation requires, for example when pedestrians or oncoming vehicles are detected by one or more of the sensors $S_1 \ldots S_n$ and, accordingly, a change in the geometry and/or intensity of the light image 11' of the roadway illumination is desirable. The imaging system 12 is illustrated simplified here as a lens.

The term "roadway" is used for simplified illustration here since, of course, it depends on the local circumstances whether the light image 11' is in fact located on the roadway or also extends beyond it. In principle, the image 11' corresponds to a projection onto a vertical surface area in accordance with the relevant standards that refer to motor vehicle lighting technology.

Figure 4:
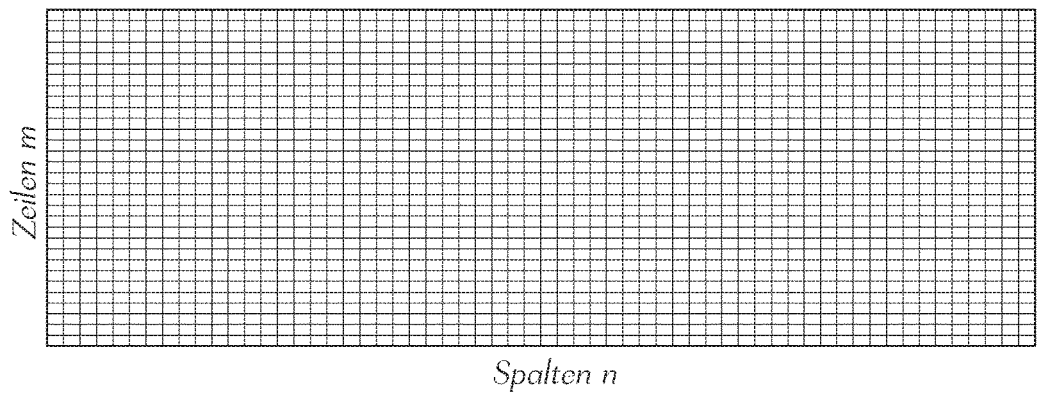
FIG. 4 shows the division of a light image into rows and columns.

Exemplary embodiments of the method according to the invention will be described hereafter in greater detail. Initially, the desired light image is divided into a pixel set having n rows and m columns, wherein in the grid shown in FIG. 4 m=30 and n=60 applies, which is to say 30 rows and 60 columns are present. It should be clear that any arbitrary, technologically reasonable other resolution may be selected here. In the illustrated example, in any case 30*60=1800 pixel fields are present.

It is now ascertained in which column and in which row the pixel is located for which the highest optical power must be delivered, wherein this optical power for each pixel depends on the desired light distribution, or on the desired intensity in the respective pixel. The corresponding specifications are defined for each pixel as a particular illumination intensity in 1x, and these values are used to calculate the required optical power in watt per pixel, taking the efficiency of the optical system of the headlight and, where necessary, the efficiency of a light conversion means into consideration.

The invention now provides that the horizontal and/or vertical characteristic control curves for the micromirror are adapted to a selected row and/or column in terms of the required optical power of the pixels, and the adapted horizontal and/or vertical characteristic control curves are used to control the micromirror. The most general case is one in which the micromirror is controlled "linearly" with respect to the two axes, and thus no resonant operation is selected. However, it should be clear that the invention can also be applied only to control with respect to one axis, namely when scanning takes place only in one axis, for example using a wide light spot or multiple micromirrors, which scan a spot on top of or next to one another.

Subsequent to the aforementioned definition of the n rows and m columns, the definition of the required illumination intensity $E_{ij}$ per pixel, and the ascertainment of the maximum required power per pixel, either the horizontal or the vertical characteristic control curve is adapted, which is to say optimized, whereby two variants are obtained. First, one variant of the invention is described in which the vertical characteristic control curve is optimized, which is that which relates to the columns and is referred to as "Variant 2," wherein reference is made to FIGS. 5a and 5b.

Figure 6:
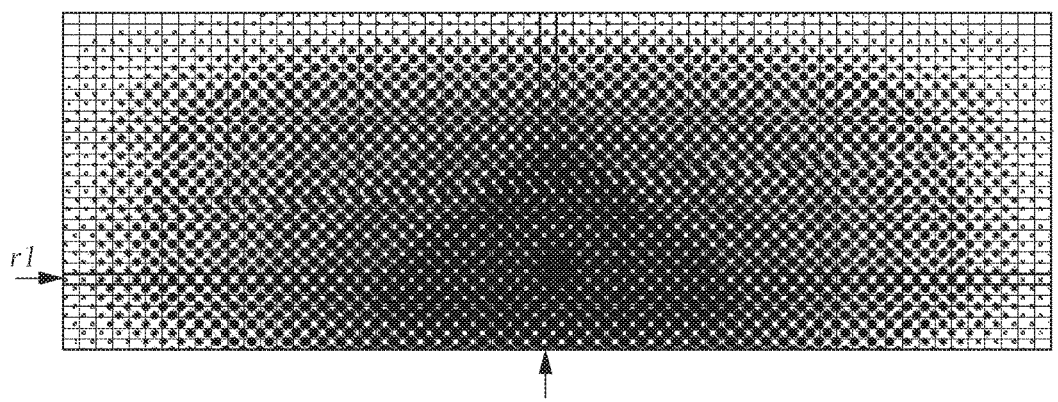
FIG. 6 shows a desirable starting light image.

Step v12:

In this step, the column in which the previously ascertained highest optical power must be delivered is defined as column c2, and the total illumination intensity of this column c2 is calculated. FIG. 6 shows the desired light image in which the column c2 was ascertained with the maximum illumination intensity.

The total illumination intensity is denoted by $E_{c2\ ges.}$

Step v22:

In this subsequent step, proceeding from this total illumination intensity, it is calculated what unit of time per illumination intensity $t_{slx}$ is available in this column c2.

$$t_{slx} = T_S/E_{c2\ ges.}$$

Here, $T_S$ denotes half the period duration of the column period, and $E_{c2\ ges.}$ denotes the sum of all predefined illumination intensity values per pixel which is required in this half period duration of the column period. A column period shall be understood to mean the duration that the mirror requires when pivoting about a (horizontal) axis for scanning in the vertical direction, which is to say in the column direction.

Step v23:

Thereafter, the respective illumination intensities of the column c2 $E_{c2n}$, which are present in a series, are used to create a new series, wherein the illumination intensity $E'_{c2n}$ of every element of the new series is $E'_{c2n} = \Sigma_{j=1}^{n} E_{c2j}$.

Figure 7:
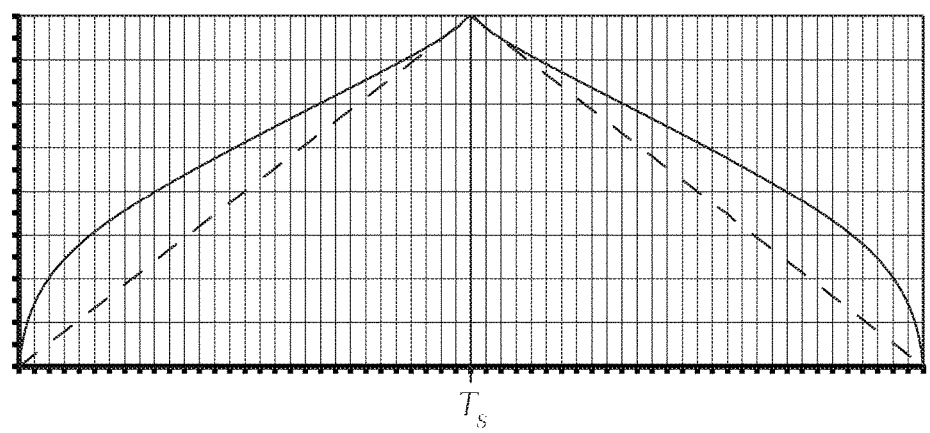
FIG. 7 shows an optimized characteristic control curve.

Step v42:

In this subsequent step, the elements of the new series are multiplied by the unit of time per illumination intensity $t_{slx}$, and they are defined by way of the deflection angle $\alpha_V' = \alpha_{Vmax}/n$ available for every pixel as a new optimized characteristic control curve, which is shown in solid form for one example in FIG. 7 where also the deviation from the dotted linear control is apparent. $T_s$ denotes half the period duration of the column period. The x-axis in FIG. 7 represents the time, and the deflection takes place across the entire column period and thus $T_s$ corresponds to half this time.

Step v52:

The optimized characteristic control curve is now applied, and linear, and thus not optimized, control is used for the remaining axis.

Step v62:

In this step, the utilization is evaluated (such as in % of the laser power per pixel), and the row having the best utilization $\eta_{max}$ is ascertained:

The evaluation can take place either by way of calculation or by way of measurement.

If the evaluation is to take place by way of measurement, a corresponding headlight system is set up, and the utilization of the installed laser power is back-calculated for every pixel via the luminous flux in the created light image. It is possible, for example, to measure the luminous flux for every pixel, and back-calculate it to watt per pixel via the efficiency of the light conversion means (phosphor).

From a calculation point of view, one must proceed from the possible deliverable optical power of a laser diode in the light image. For example, a laser diode delivers 1 W of optical power, which is to be divided among the 60×30 pixels, for example, due to the scanning process.

With a linear control curve, optical power of 0.556 mW could be delivered in each pixel in this example.

With the optimized control curve, this power of 1 W, however, is no longer divided evenly, but is distributed at varying speeds across the pixels according to the optimized control curve.

The optical power distribution, resulting from the use of the optimized control curve, using a laser diode of one watt, for example, can then be used to calculate the number of laser diodes needed for every pixel, namely as the required optical power per pixel $P_{m,n}$ divided by the deliverable optical power per pixel $P_{m,n}$ by way of the optimized characteristic control curve, using a laser diode having 1 W optical power, for example.

In this way, the number of laser diodes needed for the respective pixels is obtained, wherein, of course, rounding is necessary if the result of the division is not an integer.

The utilization of the installed laser for every pixel $P_{m,n}$ is then obtained by the dividing the required optical power in pixels $P_{m,n}$ by the product of the deliverable power of a laser diode in pixels $P_{m,n}$ and the maximum number of required laser diodes in all pixels.

Figure 8:
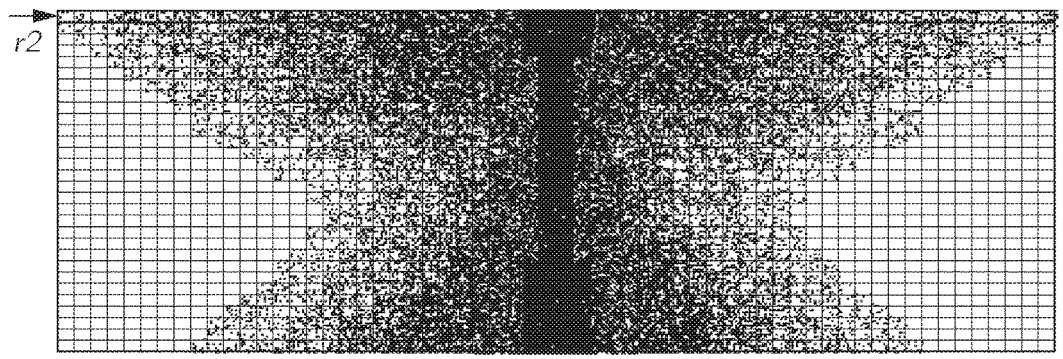
FIG. 8 shows a diagram illustrating the utilization of the installed laser power after carrying out an optimization method.

FIG. 8 shows the utilization of the installed laser power in every pixel calculated or measured for a representative example, wherein a higher utilization corresponds to a higher density of dots in the drawing.

Step v72:

Now, the column having optimal utilization of the installed laser power is selected and used for the optimization of the characteristic control curve of the remaining axis (the horizontal characteristic control curve in this example).

The procedure is, in principle, the same as with the optimization of the vertical characteristic control unit in method steps v12, v22, v32, v43; however, here one does not proceed from the illumination intensity, but from the utilization of the installed laser power per pixel.

For this purpose, the row in which the previously ascertained highest utilization of the installed laser power was able to be delivered is defined as row r2, and all utilizations of the installed laser power in the respective pixel are added up. See also step v82.

Step v82:

Thereafter, proceeding from the utilization $\eta_{r2\ ges.}$, namely the sum of the utilizations from step v72, it is calculated what unit of time per illumination $t_{Z\eta}$ is available in this row r2.

$$t_{Z\eta} = T_Z / \eta_{r2\ ges.}$$

wherein $T_Z$ is half the period duration of the row period, and $\eta_{r2\ ges.}$ is the sum of all calculated or measured utilizations of the installed laser power per pixel which is required in this half period duration of the row period.

Step v92:

In this step, the respective utilization values of the row r2 are used to create a new series, wherein the illumination intensity $\eta'_{r2m}$ of every element of the new series is $\eta'_{r2m} = \Sigma_{j=1}^{m} \eta_{r2j}$.

Figure 9:
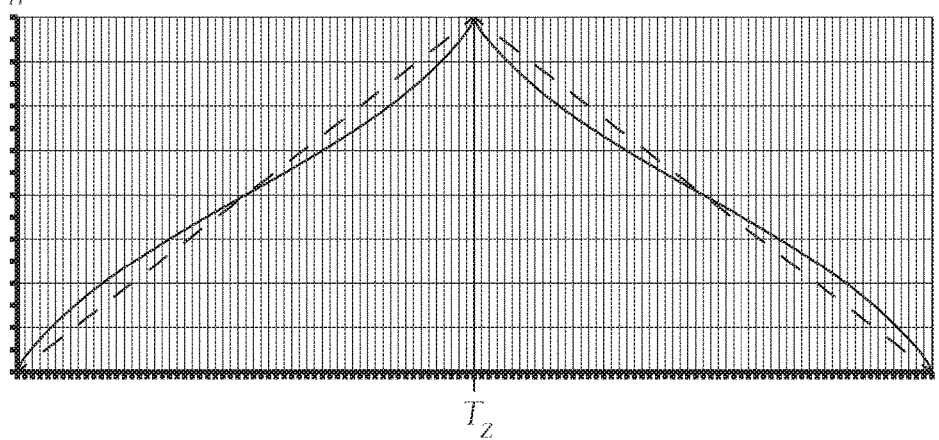
FIG. 9 shows a further optimized characteristic control curve.

Step v102:

Now, the elements of the new series are multiplied by the unit of time per utilization $t_{Z\eta}$ and are defined via the deflection angle $\alpha_H' = \alpha_{Hmax}/m$ available for every pixel as a new optimized characteristic control curve for the horizontal control of the micromirror. For the considered example, this characteristic curve is shown as a solid curve in FIG. 9, while the dotted line again corresponds to linear control without optimization, wherein it is apparent that the deviation of the optimized horizontal characteristic control curve from the linear progression is now only minor.

Figure 10:
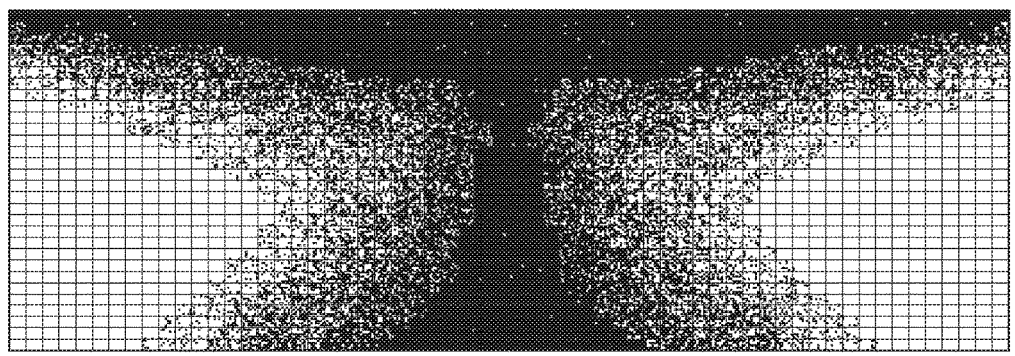
FIG. 10 shows a diagram illustrating the utilization of the installed laser power after carrying out a further optimization method.

Step v112:

A usable optimized characteristic control curve has now been obtained for both the vertical and the horizontal axis of the microscanner or micromirror. In this application, analogously to step v62, the utilization of the installed laser power is either calculated or measured in a test set-up. This utilization is shown in FIG. 10 in a representation comparable to FIG. 8.

Figure 5A:
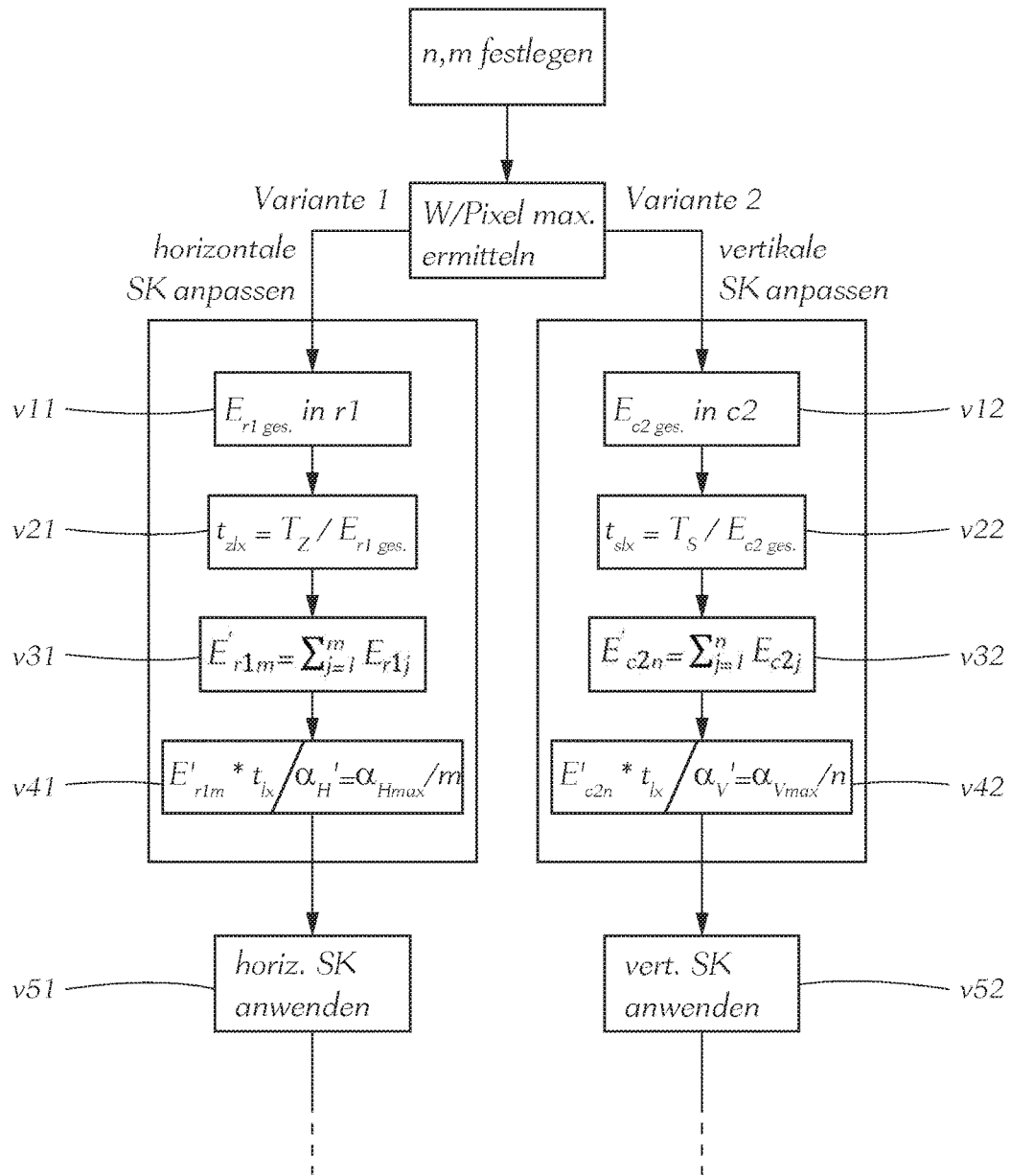
FIGS. 5a and 5b show flow charts of two variants of the method according to the invention.
Figure 5B:
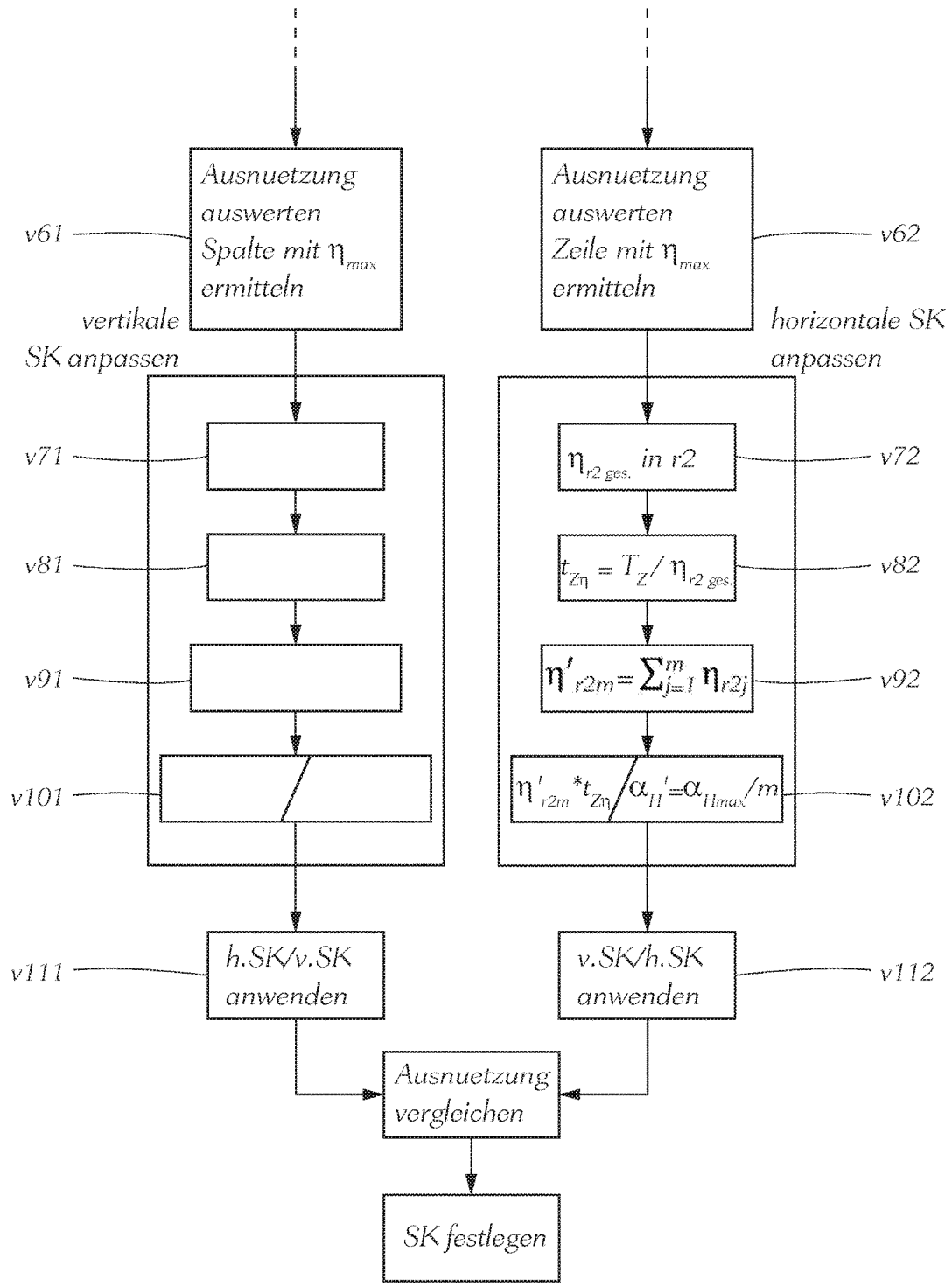

Analogously, the optimization of the characteristic control curves of the respective axes takes place in reverse order, which resulted in one variant of the invention in which the horizontal characteristic control curve is optimized, which is that which relates to the rows and is referred to as "Variant 1." The flow charts in FIGS. 5a and 5b show this in steps v11 through v111, wherein no separate explanation is required here since only the rows and columns, or "horizontal" and "vertical," have been swapped here compared to the second variant. The row r1 having the maximum illumination intensity in the desired light image is apparent in FIG. 6, which was already mentioned above.

Figure 11:
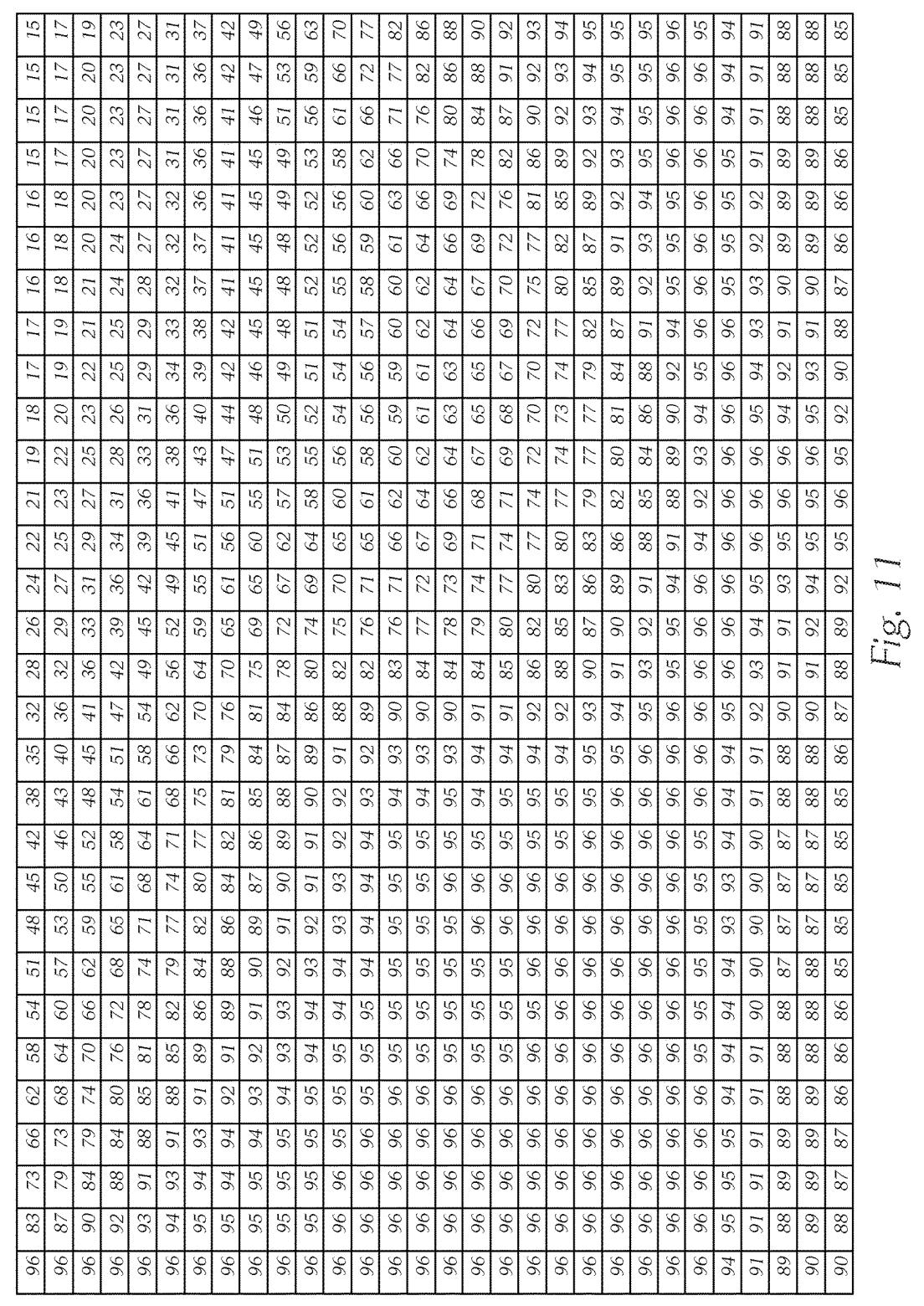

Thus, first the optimization of the horizontal characteristic control curve takes place, this is then applied in step v51 and subsequently evaluated in step v61 so as to optimize the remaining vertical characteristic control curve in the subsequent steps v71 through v101. The utilization when employing the method according to variant 1 is represented in FIG. 11, wherein in this figure, deviating from the representations according to FIGS. 8 and 10, the percentage of the utilization for every pixel is entered in numbers. For the sake of a clear illustration, FIG. 11 only shows the "left" half of the light image; the "right" half would have to be added laterally reversed for the entire light image.

Regardless of whether variant 1 or 2 is employed, utilizations of the laser power close to 100% are achieved in the important regions of the light image.

When the above-described methods are employed, a variety of characteristic control curves are obtained, which result in different utilizations of the installed laser power. More precisely, both an optimized horizontal characteristic control line and an optimized vertical characteristic control line are obtained for each variant. Which variant is better depends on the desired light image, the resolution, and the desired intensity in the respective pixels, so that a comparison of the results is recommended, which can be carried out in the step "Compare utilization." Typically, however, the optimized horizontal characteristic control curve and the optimized vertical characteristic control curve of the respective variant fit together the best in the spirit of a best-possible overall utilization.

When looking at the method shown in FIGS. 5a and 5b, it is apparent that different combinations or simplifications are possible. It is possible, for example, to employ the optimized horizontal characteristic control curve obtained in variant 1 with the optimized vertical characteristic control curve obtained in variant 2, and vice versa, and to determine, in a comparison, the combination of characteristic control curves which is the most favorable for the specific case, so as to then use this combination for controlling the micromirror.

In many cases, it will not be necessary to employ the aforementioned comparison, which is to say only one variant of the method is then carried out, and the result obtained is employed without further verification. As was already mentioned above, the optimization, by nature, is only carried out in this single axis for a headlight scanning only in one axial direction, corresponding to steps v61 through v101 of variant 1, for example.

The invention claimed is:

1. A method for controlling a light scanner (7) in a headlight for vehicles, the method comprising:
   directing a laser beam of at least one modulated laser light source (1) in a scanning manner, by way of the light scanner, onto a light conversion means (8) so as to generate a light image (11) thereon, which is projected via an imaging system (12) as a light image (11') onto a roadway; and pivoting a micromirror (10) of the light scanner according to defined characteristic control curves in at least one coordinate direction, wherein:

the desired light image (11) is divided into a pixel set having n rows and/or m columns;

horizontal and/or vertical characteristic control curves for the micromirror (10) are adapted to at least one selected row and/or column in terms of the required optical power of the pixels; and the adapted horizontal and/or vertical characteristic control curves are used to control the micromirror.

2. The method according to claim 1, wherein the selected row and/or column is that in which, in total across the n pixels thereof, the maximum illumination intensity is required.

3. The method according to claim 1, wherein:

the desired light image is divided into a pixel set having n rows and m columns;

in a first step, for optimizing the characteristic control curves according to the desired light distribution for every pixel of the pixel set, the required illumination intensity $E_{ij}$ is defined;

in a second step (v12), the column (r)/row selected is that in which, in total across the n pixels thereof, the maximum illumination intensity, namely the total illumination intensity of this column c2/row, is required;

in a third step (v22), it is calculated, proceeding from this total illumination intensity, what unit of time per illumination intensity $t_{Ix}$ is available on average in this column (c2)/row, namely $t_{sIx}=T_s/E_{c2}$ges., wherein $T_s$ denotes half the period duration of the column period/row period, and $E_{c2\ ges.}$ denotes the sum of all predefined illumination intensity values per pixel which is required in this half period duration of the column period;

in a fourth step (v32), the illumination intensities ($E_{c2n}$) of the column (c2)/row, which are present in a series, are used to create a new series, wherein the illumination intensity $E'_{c2n}$ of every element of the new series is $E'_{c2n}=E_{c2j}$;

in a fifth step (v32), every element of the new series is multiplied by the unit of time per illumination intensity $t_{sIx}$ so as to obtain a new time series that, by way of the deflection angle $\alpha v'=\alpha_{Vmax}/n$ available for each pixel, is defined as a new optimized characteristic control curve, and every element of the time series is multiplied by the deflection angle $\alpha'=\alpha_{max}/n$ available for every pixel, whereby a deflection, and thus an optimized characteristic control curve, is obtained for every pixel of the column/row; and in a sixth step (v52,) this characteristic control curve is used to control the micromirror for each column/row.

4. The method according to claim 3, wherein the remaining axis is controlled using a defined, non-optimized characteristic control curve.

5. The method according to claim 3, wherein:

in a seventh step (v62), the utilization of the laser power per pixel is evaluated, and the row/column having the best utilization $\eta_{max}$ is ascertained;

in an eighth step (v72), the column having optimal utilization of the installed laser power is selected and used for the optimization of the characteristic control curve of the remaining axis, and thereafter the procedure follows steps analogously to the first (v11), second (v22), third (v32) and fourth (v42) steps, proceeding from the utilization of the installed laser power per pixel, wherein all utilizations of the installed laser power in the respective pixel are added up in the row (r2) in which the previously ascertained highest utilization of the installed laser power was able to be delivered;

in a ninth step (v82), it is subsequently calculated, proceeding from the utilization $\eta_{r2\ ges}$, what unit of time per utilization $t_{Zn}$ is available in this row (r2), $t_{Zn}=T_Z/\eta_{r2\ ges.}$ wherein $T_Z$ is half the period duration of the row period, and $\eta_{r2\ ges.}$ is the sum of all calculated or measured utilizations of the installed laser power per pixel which is required in this half period duration of the row period;

in a tenth step (v92), the respective utilization values of the row (r2) are used to create a new series, wherein the illumination intensity $\eta'_{r2m}$ of every element of the new series is $\eta'_{r2m}=\Sigma_{j=1}^{m}\eta_{r2j}$; and in an eleventh step (v102), the elements of the new series are multiplied by the unit of time per utilization $t_{Zn}$ and, by way of the deflection angle $\alpha_H'=\alpha_{Hmax}/m$ available for every pixel, are defined as a new optimized horizontal/vertical characteristic control curve.

6. The method according to claim 5, wherein in a twelfth step (v112), the optimized characteristic control curve is used for the vertical/horizontal axis and the horizontal/vertical axis and, analogously to the seventh step (v62), the utilization of the installed laser power per pixel is ascertained.

7. The method according to claim 3, wherein the optimization of the characteristic control curves is carried out step by step (steps v11 through v111) in reverse order with respect to the rows and columns, or axes, so as to obtain furthermore two optimized characteristic control lines.

8. The method according to claim 1, wherein a selection from all the resulting optimized characteristic control curves takes place as a function of the desired light image, wherein the most favorable combination is used to control the light scanner.

9. A headlight for vehicles, comprising:

a light scanner (7) comprising a micromirror (10);

a light conversion means (8);

an imaging system (12);

a laser control unit (3) and a processing unit (2) associated therewith; and at least one modulated laser light source (1), the laser beam of which can be directed in a scanning manner, by way of the light scanner (7), onto the light conversion means (8) so as to generate a light image (11) thereon, which is projected via the imaging system (12) as a light image (11') onto a roadway, wherein the micromirror (10) of the light scanner is pivotable according to defined characteristic control curves in at least one coordinate direction, and wherein the processing unit (4) is configured to carry out the method of claim 1.

* * * * *

UNITED STATES PATENT AND TRADEMARK OFFICE
CERTIFICATE OF CORRECTION

PATENT NO. : 10,207,630 B2
APPLICATION NO. : 15/568154
DATED : February 19, 2019
INVENTOR(S) : B. Reisinger et al.

It is certified that error appears in the above-identified patent and that said Letters Patent is hereby corrected as shown below:

In the Claims

Column 11, Line 46 (Claim 3, Line 25) please change "$c_{2n}=E$" to -- $c_{2n}=\Sigma_{j=1}^{n} E$ --

Signed and Sealed this
Second Day of July, 2019

Andrei Iancu
*Director of the United States Patent and Trademark Office*